Figure 1:
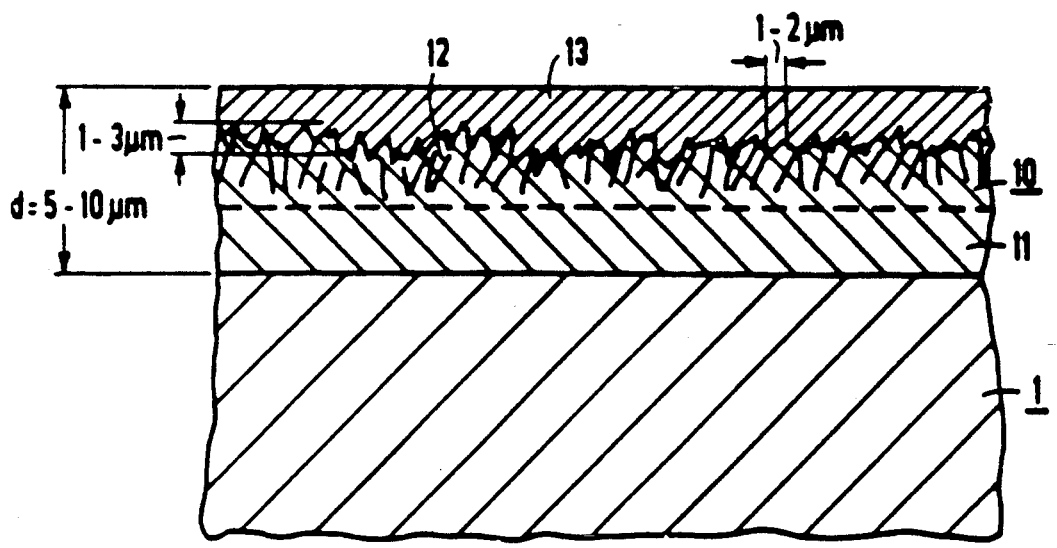

United States Patent

Freller et al.

[11] Patent Number: 5,100,701
[45] Date of Patent: Mar. 31, 1992

[54] SOLDER-REPELLING COATING FOR TOOLS

[75] Inventors: Helmut Freller, Roethenbach; Hans P. Lorenz, Schwarzenbruck; Friedrich Horauf; Peter Schack, both of Nuremberg, all of Fed. Rep. of Germany

[73] Assignee: Siemens Aktiengesellschaft, Berlin & Munich, Fed. Rep. of Germany

[21] Appl. No.: 442,340

[22] PCT Filed: Apr. 27, 1988

[86] PCT No.: PCT/DE88/00251
§ 371 Date: Feb. 2, 1990
§ 102(e) Date: Feb. 2, 1990

[87] PCT Pub. No.: WO88/08356
PCT Pub. Date: Nov. 3, 1988

[30] Foreign Application Priority Data

Apr. 29, 1987 [DE] Fed. Rep. of Germany ....... 3714339

[51] Int. Cl.⁵ .................. B32B 9/00; B32B 15/00; B32B 18/00
[52] U.S. Cl. ................... 428/215; 428/422; 428/697; 428/698; 428/699
[58] Field of Search .......... 428/215, 422, 698, 699, 428/697

[56] References Cited

U.S. PATENT DOCUMENTS

| | | | |
|---|---|---|---|
| 2,740,193 | 4/1956 | Pessel | 29/487 |
| 4,204,886 | 5/1980 | Bens | 148/15.5 |
| 4,420,110 | 12/1983 | McCollough et al. | 228/54 |
| 4,603,704 | 8/1986 | Mund et al. | 128/784 |
| 4,619,865 | 10/1986 | Keem et al. | 428/333 |
| 4,643,951 | 2/1987 | Keem et al. | 428/469 |

FOREIGN PATENT DOCUMENTS

| | | |
|---|---|---|
| 0206121 | 12/1986 | European Pat. Off. |
| 1446741 | 6/1969 | Fed. Rep. of Germany |
| 2321533 | 3/1977 | France |
| 1418807 | 12/1973 | United Kingdom |
| 2130253 | 5/1984 | United Kingdom |

Primary Examiner—William J. Van Balen
Attorney, Agent, or Firm—Kenyon & Kenyon

[57] ABSTRACT

Especially in gripper, insertion and bending tools of automatic insertion machines for electric components, the problem arises, that the production flow is adversely influenced because of solder accumulations at the tools. In machine design it is already known to apply hard material layers on a nitride base to improve tool surfaces; normally, better solder resistance is expected of them. According to the invention at least one second layer is provided as the cover layer with solid-lubricant properties, besides the nitride base layer. The base layer has here preferably a gradual change from high density in the boundary region to the base material of the tool to a porous rough structure at the boundary surface to the cover layer, where the change of the density can be continuous. The metal-nitride layer is advantageously a titanium nitride.

With such coatings, the service life of the tools can be increased by more than one order of magnitude.

20 Claims, 1 Drawing Sheet

SOLDER-REPELLING COATING FOR TOOLS

The invention relates to a solder-repelling coating for tools, especially for gripping, insertion and/or bending tools in automatic insertion machines for electric components which have at least one nitride layer as the layer base.

In the automatic insertion of circuit boards with radial, axial components or also DIP components, the tinned connecting leads or connecting lugs are bent into the insertion position after the components are inserted. At the gripping, insertion and/or bending tools, accumulations of solder occur here which have an adverse effect on the operation of the automatic insertion machines and can lead to disturbances in the course of production. Depending on the kind of components and the solder used for tinning the terminals, insertion disturbances are found, according to experience, already after $1 \times 10^4$ to $5 \times 10^4$ components.

Up to now, in the event of insertion trouble the tools are freed of the accumulated solder, which must be done by scraping out or also reworking the insertion tools. With such maintenance and the down time connected therewith of the automatic insertion machine, goes along a not in considerable operating costs.

It is therefore an object of the invention to improve the tools by a solder-repelling coating in such a manner that larger numbers of insertions can be achieved without additional maintenance.

According to the invention, the problem is solved by a solder-repelling coating with a metal-nitride base, in which, besides the metal-nitride base layer generated by a coating process, at least a second layer is provided as a cover layer with solid-lubricant properties. Preferably, the base layer has a gradual change from high density in the border region to the base material of the tool to a porous structure at the boundary surface to the cover layer. Advantageously, the metal-nitride layer is here the well known titanium nitride.

The invention is based on the fact that the coating of tools, known per se in machine design, of tools with hard material layers, especially of titanium nitride, also ensures better resistance to melted solder. Although experimental examinations showed that such hard material layers were not yet sufficiently usable for the intended purpose, the coating is usable for the intended purpose only if a cover layer with solid lubricant properties is applied on such hard material layers. It is utilized here that the titanium nitride can be produced on the one hand with a structure of high density which adheres well to the base material and on the other hand with a porous structure, where the porous layer and the micro-roughness connected therewith serves for anchoring and as a depot for the solid lubricants.

Organic as well as inorganic substances can be considered as the cover layer with the solid lubricant properties. In particular, a known teflon suspension has been found suitable as an organic substance which can be produced by immersion or spraying-on and subsequent firing as the cover layer. Besides there can be used as an inorganic substance, for instance, the well known solid lubricant molybdenum sulfide in a silver matrix or metal-carbon combinations such as silver graphite, zirconium-carbon, iron-nickel carbon or also iron-nickel-chromium carbon.

The latter substances are known in technology because of their good trilological properties and ar used customarily as solid lubricants. In the invention it is now advantageously utilized that in the cover layer, the softer solid lubricant is sufficiently enough anchored in the hard base layer due to its microroughness. In this combination, surprisingly good and long-lasting solder-repellent properties of such a layer structure are obtained. Even in the event of partial abrasion in the region of the peaks and after leveling the surface, sufficient solid lubricant remains as a depot in the depressions and thus maintains the solid-repellent function.

Further details and advantages of the invention are obtained from the description of examples, reference being made to the figures of the drawing.

FIG. 1 shows schematically a layer structure by way of example and

Figure 2:
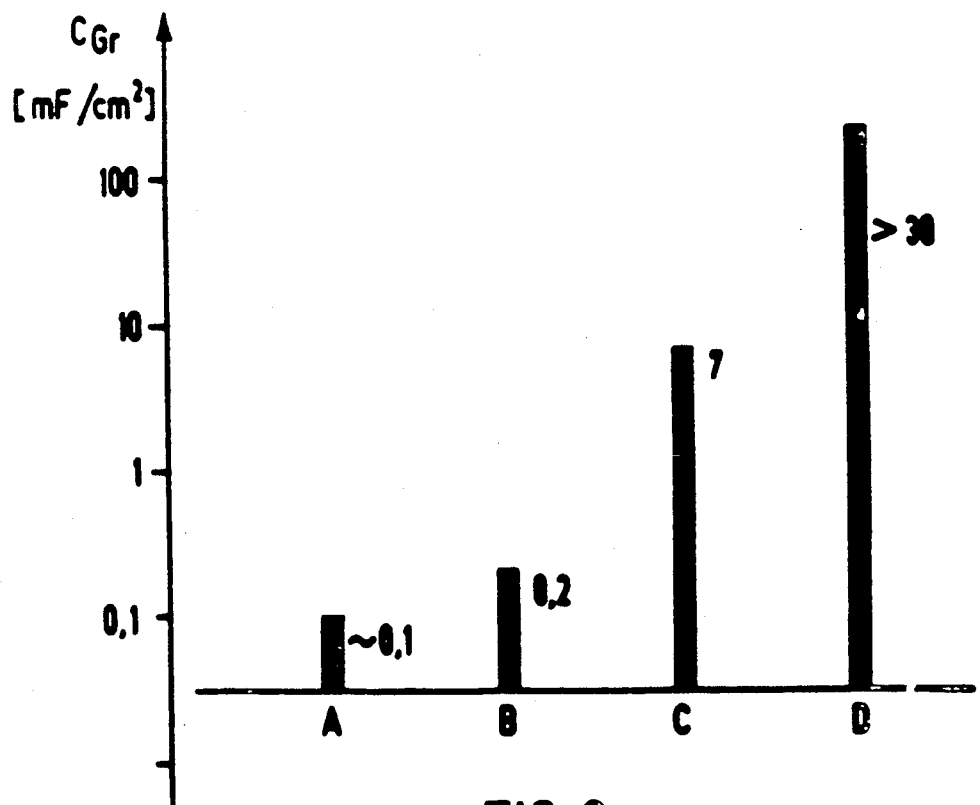

FIG. 2, a graphic display of the dependence of the porosity on the choice of the coating parameters.

In the figure, the base material of the tool is designated with 1, to which a cover layer 10 is applied. The cover layer consists of a dense TiN layer 11 on the surface of the tool which adheres well and changes into a porous layer 12 on the side facing away from the work piece. The transition from the dense TiN layer 11 to the porous rough TiN layer 12 can take place, as indicated in the figure, in defined steps or advantageously also continuously. It is important in any case that the TiN layer 12 has, on the side facing away from the base material 1 a rough surface full of fissures with humps and depressions. On this surface there is a further layer 13 of a suitable solid lubricant, the surface of which is plane. The thickness d of the layer 10 is customarily 5 to 10 $\mu$m and should be smaller than 15 $\mu$m. Of this, about ⅔ belong to the base layer 11, where the microroughness has a depth of 1 to 3 $\mu$m with a crystallite diameter of about 1 to 2 $\mu$m.

For producing such layers, customary process technologies are used such as low-temperature ion plating or cathode sputtering which in detail depends on the specific element combinations of the examples:

EXAMPLE 1

Combination of TiN with an organic solid lubricant.

Porous TiN layers which are suitable for receiving lubricant depots can be prepared alternatively by reactive vapor deposition or also by reactive atomizing. This is described in detail in DE-A-33 00 668 (U.S. Pat. No. A-4,603,704).

In such methods the relative orientation of the substrate relative to the impinging material particles and the electric potential at the substrate (so-called bias voltage) can be changed, besides the type and quantity of the layer material as parameters during the coating process.

In FIG. 2, the coating process is illustrated. Plotted is on a logarithmic scale the boundary surface capacity $C_{Gr}$ in mF/cm$^2$ as a measure for the porosity of the layer as a function of the variation of the coating parameters: in region A, the substrate 1 from FIG. 1 is set parallel to the target so that the material particles impinge perpendicularly and a bucking voltage of about 100 V is applied. A very dense layer with good adhesion on the substrate is obtained. Subsequently, the substrate voltage is removed in the region B whereby the density of the layer is reduced and thereby, the porosity is increased. In region C, the substrate is inclined at an angle between 45° and 90° relative to the incident material particles, whereby the porosity of the layer is increased further. Finally, the target is moved in the region D so that continuously changing angles of incidence of the material particles and thereby, statistical irregularities in the layer structure are obtained with a further increase of porosity.

By the mentioned changes of the coating parameters, the density of the layer can be varied between 100 and 50%. With suitable process management it is possible to generate a continuous transition from a dense base layer which adheres strongly to the base material of the tools, to a porous surface layer in a single coating process by variation of the coating parameters with time.

On such a layer, commercially available teflon suspensions are, for instance, sprayed or applied by immersion in liquid and subsequently fired. Thereby, a particularly abrasion-proof layer is formed, in which the teflon is embedded in a synthetic resin matrix.

EXAMPLE 2

Combination of TiN with molybdenum sulfide as the inorganic solid lubricant.

The TiN layer is prepared as in Example 1. Molybdenum sulfide is to be applied to the fissioned surface. The molybdenum sulfide is present with 5% in a silver matrix, where the silver contributes substantially to the good adhesion to the TiN structure. This cover layer with lubricant embedments can be produced by cathode sputtering.

EXAMPLE 3

Combination of TiN with graphite in an inorganic solid lubricant.

According to Example 2, graphite is applied to a TiN base layer, the graphite being present with 5 to 10% in a silver matrix.

EXAMPLE 4

Combination of TiN with metal-carbon as the inorganic solid lubricant.

Amorphous carbon is to be applied as the solid lubricant to the TiN layer. The possibility exists here to build up the layers with carbon components from a metallic base layer, in which the metal content goes down with increasing layer thickness and in which preponderantly carbon is present at the surface. Such a layer structure again brings out good adhesion to the metallic substrates over the metallic base layer.

Specifically, a cover layer according to Example 3 is applied by cathode sputtering in the course of the coating process, for instance, acetylene is admitted into the evaporation system. By the carbon coating which is built up on the cathode the sputtered metal component goes back more and more, where the dependence of the metal share in the layer can be adjusted by the partial gas pressure. As the carrier metal can be considered here zirconium (Zr), or iron-nickel (FeNi) or also iron-nickel-chromium (FeNiCr=V2A steel).

Tools for automatic insertion machines were provided with the coating described in Examples 1 to 4. Specifically on the bending tools designated as so-called "outside formers", of automatic insertion machines which come into contact with the solder-equipped lead wires of the components, comparison tests were made. It was found that it was possible to increase the service life of the tools considerably by the coatings according to the invention. Due to the solder accumulation-retarding effect of the described coatings, an increase of the quantity of insertions by more than 25 times was achieved. Thereby, a considerable gain in operating economy is achieved in the employment of automatic insertion machines

What is claimed is:

1. A solder-repelling coating for a tool, the tool having a surface, the solder-repelling coating comprising: a metal-nitride base layer disposed on the tool surface, said base layer having a porous, rough outer surface; and a cover layer having solid-lubricant properties disposed on said porous, rough outer surface of the base layer, wherein the base layer is characterized by having a varying density, the density gradually and continuously decreasing from a high density, where the base layer contacts the tool surface, in a direction toward the porous, rough outer surface of the base layer.

2. A coating according to claim 1 wherein the metal-nitride layer is a titanium-nitrogen compound ($TiN_x$).

3. A coating according to claim 2 wherein the metal-nitride layer is titanium nitride.

4. A coating according to claim 1 wherein the cover layer with the solid-lubricant properties is an organic substance.

5. A coating according to claim 4 wherein the cover layer with the solid-lubricant properties is a fired-on teflon suspension.

6. A coating according to claim 1 wherein the cover layer with the solid-lubricant properties is an inorganic substance.

7. A coating according to claim 6 wherein the cover layer with the solid-lubricant properties is silver-molybdenum sulfide ($Ag:MoS_2$).

8. A coating according to claim 1 wherein the cover layer with the solid-lubricant properties is a metal-carbon combination.

9. A coating according to claim 8 wherein the metal-carbon combination is silver graphite ($Ag:C$).

10. A coating according to claim 8 wherein the metal-carbon combination is zirconium carbon ($Zr:C$).

11. A coating according to claim 8 wherein the metal-carbon combination is iron-nickel carbon ($FeNi:C$).

12. A coating according to claim 8 wherein the metal-carbon is iron-nickel-chromium carbon ($FeNiCr:C$).

13. A coating according to claim 1 wherein the total thickness (d) of the base layer and cover layer together is smaller than 15 μm and wherein the thickness of the base layer alone is about ⅔ of said total thickness.

14. A coating according to claim 8 wherein the total thickness (d) of the base layer and cover layer together is smaller than 15 μm and wherein the thickness of the base layer alone is about ⅔ of said total thickness.

15. A layered structure comprising a tool substrate, a metal-nitride base layer coating which coats the tool substrate, and a cover layer having solid lubricant properties which coats the base layer, said base layer having a side of high density which is in contact with the substrate and a porous side which is in contact with the cover layer, wherein the density of the base layer gradually and continuously decreases from the side of high density in the direction of the porous side.

16. The layered structure according to claim 15 wherein the metal-nitride layer is a titanium-nitrogen compound ($TiN_x$).

17. The layered structure according to claim 15 wherein the metal-nitride layer is titanium nitride.

18. The layered structure according to claim 15 wherein the cover layer with the solid-lubricant properties is an organic substance.

19. The layered structure according to claim 15 wherein the total thickness (d) of the base layer and cover layer together is smaller than 15 μm and wherein the thickness of the base layer alone is about ⅔ of said total thickness.

20. The layered structure according to claim 15 wherein the cover layer with the solid-lubricant properties is silver-molybdenum sulfide ($Ag:MoS_2$).

* * * * *